(12) United States Patent
Marsh (10) Patent No.: US 6,481,919 B2
(45) Date of Patent: Nov. 19, 2002

(54) CONNECTION DEVICE HAVING AN ANGLED EXTENDING MEMBER

(75) Inventor: Thomas R. Marsh, High Point, NC (US)

(73) Assignee: Tenn-Tex Plastics, Inc., Colfax, NC (US)

(*) Notice: Subject to any disclaimer, the term of this patent is extended or adjusted under 35 U.S.C. 154(b) by 67 days.

(21) Appl. No.: 09/777,311

(22) Filed: Feb. 6, 2001

(65) Prior Publication Data

US 2002/0106241 A1 Aug. 8, 2002

(51) Int. Cl.[7] ............................................. F16B 12/02
(52) U.S. Cl. ..................... 403/403; 403/231; 403/245
(58) Field of Search ................................. 403/403, 231, 403/331, 245, 384, 205, DIG. 13, 306, 345

(56) References Cited

U.S. PATENT DOCUMENTS

| 3,999,878 | A | * | 12/1976 | Robinson | 403/407 |
|---|---|---|---|---|---|
| 4,060,949 | A | * | 12/1977 | Busse | 403/298 |
| 4,639,161 | A | * | 1/1987 | Mazaki | 403/245 |
| 4,973,187 | A | * | 11/1990 | Sauder | 403/231 |
| 6,238,129 | B1 | * | 5/2001 | Rahn | 403/301 |

OTHER PUBLICATIONS

Pictures of prior art connector (admitted prior art).

* cited by examiner

Primary Examiner—Lynne H. Browne
Assistant Examiner—Kenneth Thompson
(74) Attorney, Agent, or Firm—Myers Bigel Sibley & Sajovec (57) ABSTRACT

Connectors that may be used to join two objects together comprise a body portion having a first surface for engaging a first object and an extending member that protrudes from the body portion that is configured to fit within an aperture on a second object. In these embodiments of the invention, the first surface and the extending member are inclined relative to each other. A fastener is also provided that may be used to connect the body portion to the first object. By placing the extending member in the aperture on the second object, and by using the fastener to join the connector to the first object, the connector acts to connect the first and second objects together. The distal end of the extending member may be rotated in a direction towards the first object to provide a tighter join.

41 Claims, 8 Drawing Sheets

CONNECTION DEVICE HAVING AN ANGLED EXTENDING MEMBER

FIELD OF THE INVENTION

The present invention relates to connectors, and more particularly to connectors for joining first and second objects.

BACKGROUND OF THE INVENTION

Connectors are used in a wide variety of applications to connect two objects together. By way of example, in the furniture industry it is often necessary to connect two boards or walls that comprise part of the piece of furniture, and this is typically accomplished using a wide variety of connectors and/or connection means such as screws, nails, glue, dowels, rivets and specialty connectors. The type of connector used may depend on a variety of factors, including cost, appearance, the load the connector must support, and whether or not the connector is installed at the factory or other place of manufacture as opposed to being installed later (as is the case with "ready to assemble" or "RTA" furniture or products that are sold in an unassembled state and assembled by the consumer).

Figures 1, 2A, 2B, 2C:
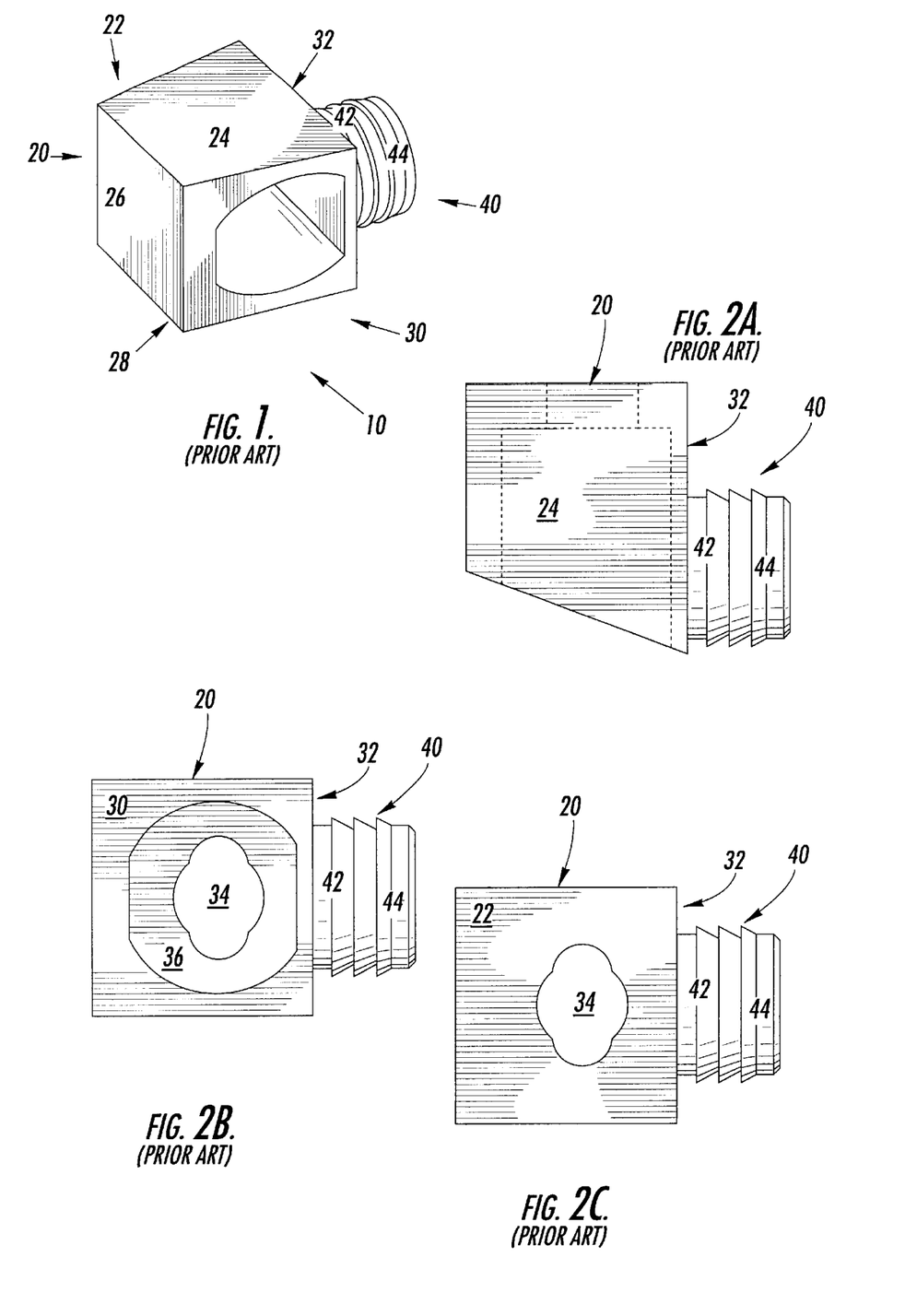
FIG. 1 is a perspective view of a prior art RTA connector.
FIG. 2A is a top view of the prior art RTA connector of FIG. 1.
FIG. 2B is a front view of the prior art RTA connector of FIG. 1.
FIG. 2C is a rear view of the prior art RTA connector of FIG. 1.
Figure 3:
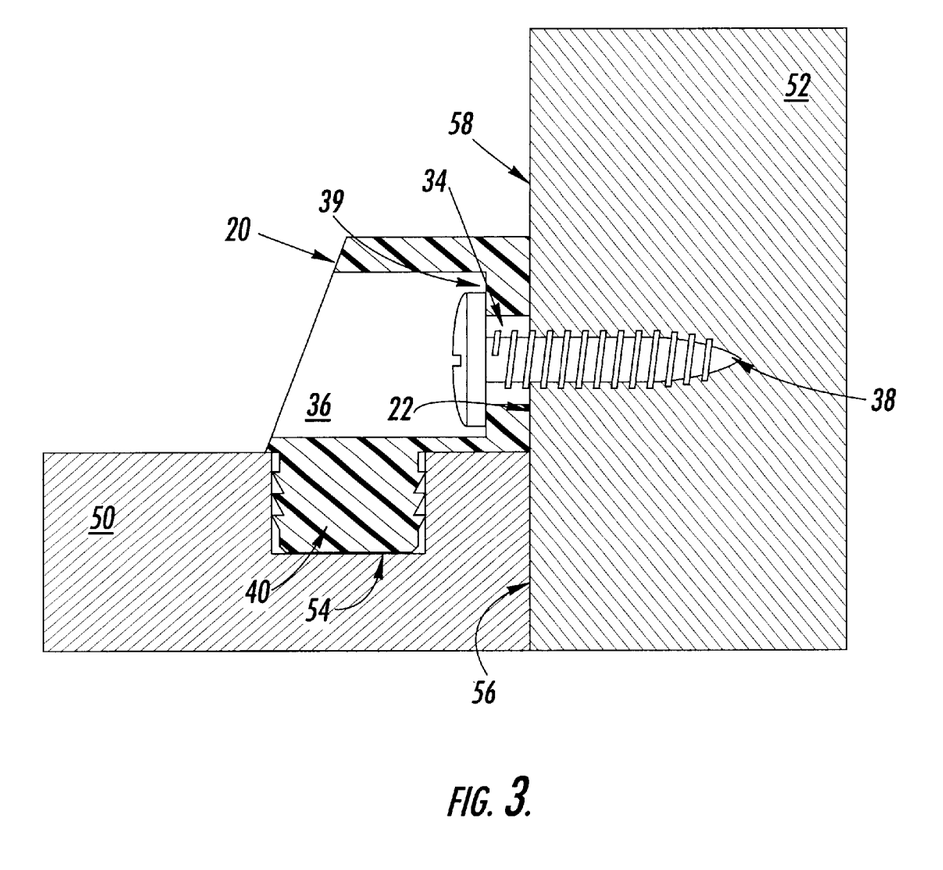
FIG. 3 is a top cross-sectional view of the prior art RTA connector of FIG. 1 taken through the central axis of aperture 34 illustrating how the connector may be used to join two walls together.

One known type of connection device 10 is depicted in FIGS. 1–3. As shown in FIG. 1, the RTA connector 10 comprises a main portion 20 and a laterally extending column 40. The main portion 20 has sides 26, 32, a rear face 22, a front face 30, a top face 24, and a bottom face 28. The laterally extending column 40 includes an inner portion 42 and a distal portion 44. Typically, the RTA connector 10 is formed out of thermoplastic such as polystyrene or ABS.

FIGS. 2A–2C depict a top view, a front view and a rear view of the RTA connector 10 of FIG. 1. As shown in FIGS. 2A–2C, the laterally extending column 40 connects to the side face 32 of main portion 20 at a 90 degree angle. The main portion 20 also includes an aperture 34 which extends from the front face 30 through the rear face 22 at a 90 degree angle to the longitudinal axis of laterally extending column 40. As shown in FIG. 2B, along the central axis of aperture 34 a larger countersunk recess 36 is formed in the front portion of rear face 22. The diameter of the recess 36 is sufficiently large so as to receive the head of a screw or nail. The diameter of aperture 34, on the other hand, is smaller than the head of the screw or nail, but large enough to receive the shank end of the screw/nail. In this manner, a screw or nail may be inserted into the front face 30 of main portion 20 and through the rear face 22 into an object, to connect the RTA connector 10 to the object.

FIG. 3 illustrates how the RTA connector 10 may be used to connect two walls 50, 52, such as the walls of a bookcase or other piece of furniture, together. As shown in FIG. 3, the laterally extending column 40 is inserted into a mating hole 54 that has been drilled into one of the faces of wall 50. Wall 52 is placed so that it abuts against the front face edge 56 of wall 50 and extends perpendicularly to wall 50. As shown in FIG. 3, the hole 54 is drilled adjacent the edge of wall 50 such that when the laterally extending column 40 of the RTA connector 10 is inserted into the hole 54, the rear face 22 of the RTA connector 10 is flush with the front face 56 of wall 50. A screw 38 is then inserted into the recess 36 and the aperture 34 and screwed into the face 58 of wall 52. As the screw 38 is tightened, the head of the screw comes into contact with a face 39 that defines the side edge of the recess 36. Thus, by inserting laterally extending column 40 into the wall 50, and the screw 38 into the wall 52, the RTA connector 10 may be used to attach walls 50 and 52 at a 90 degree angle.

Ordinarily, connectors such as the RTA connector 10 are inexpensive, easy to use, and provide a secure connection. Many prior art connectors, however, do not provide as secure a joint as may be desired, and other connectors may be prohibitively expensive for certain applications. Accordingly, there is a need for improved connectors.

SUMMARY OF THE INVENTION

Connectors are provided that may be used to join two objects together. The connectors according to embodiments of the present invention may be used in both factory assembled and ready-to-assemble products. In certain embodiments of the present invention, the connectors comprise a body portion having a first surface for engaging a first object and an extending member that protrudes from the body portion that is configured to fit within an aperture on a second object. In these embodiments of the invention, the first surface and the extending member are inclined relative to each other. A fastener (e.g., a screw) is also provided that may be used to connect the body portion to the first object. By placing the extending member in the aperture on the second object, and by using the fastener to join the connector to the first object, the connector acts to connect the first and second objects together.

In certain embodiments of the present invention, the body portion of the connector further includes a second surface. This second surface meets the first surface at an angle that exceeds 90 degrees. In these embodiments, the extending member may protrude at least partly from the second surface. The body portion of the connector may also include a third surface that meets the second surface at an angle of greater than 100 degrees, and for certain applications, these surfaces may meet at an angle of between 120 and 170 degrees. In these embodiments, the connector may be configured such that when the fastener is used to connect the body portion of the connector to the first object, the third surface of the body portion comes into contact with the second object.

In other embodiments of the present invention, the connector is configured such that the relative angle formed by the intersection of the plane defined by the first surface and the longitudinal axis of the extending member is at least 4 degrees. In other embodiments, this angle is between 10 and 40 degrees. The connector may also include an aperture, and the fastener may be inserted through this aperture to connect the body portion of the connector to the first object. In certain embodiments, the central axis of this aperture is perpendicular to the first surface of the body portion of the connector. The connector may also be configured such that the longitudinal axis of the extending member and the central axis of the aperture form an angle of between 70 and 90 degrees. The connector may further be configured so that the extending member rotates about a moment arm to urge one side of the aperture in the second object towards the first object when the fastener is used to affix the body portion of the connector to the first object.

Methods of using the connectors of the present invention to attach a first object to a second object are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 4:
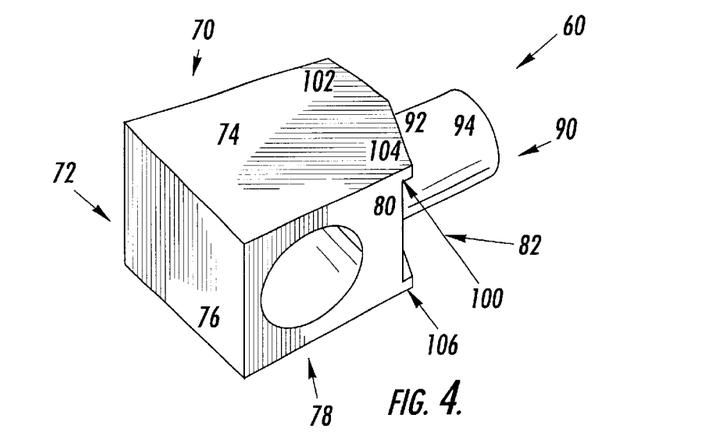
FIG. 4 is a perspective view of a connector according to embodiments of the present invention.

The discussion herein relates to connectors that may be used to join two objects together. FIG. 4 depicts one embodiment of a connector 60 made according to the teachings of the present invention. As illustrated in FIG. 4, the connector 60 comprises a body portion 70 and an extending member 90. The body portion 70 has a top surface 74, a bottom surface 78, a front surface 80, a rear surface 72 and two side surfaces 76, 82. The extending member 90 protrudes from the side surface 82 of body portion 70, and has a proximal end 92 adjacent the body portion 70 and a distal end 94.

As is also shown in FIG. 4, each end of one of the side edges of top surface 74 slopes outward to meet at an obtuse angle such that the side edge is divided into two separate segments, 102, 104. As is discussed further herein, this implementation may facilitate having the extending member 90 rotate about a moment arm to more tightly join the two objects that are to be connected together. In the embodiment of FIG. 4, the segments 102, 104 comprise part of a laterally extending rib member 100. As shown in FIG. 4, the rib member 100 does not traverse the entire lateral surface 82 of the body portion 70. Segments 107, 108 (see FIG. 5D), which correspond to segments 102, 104, are provided at one of the lateral edges of bottom face 78, where they form a second laterally extending rib member 106 that also does not traverse the entire lateral surface 82 of the body portion 70. These two rib members 100, 106 thus contact one of the objects to be joined (as opposed to the remainder of the side surface 82 of body portion 70).

FIGS. 5A–5D depict top, rear, front and side views, respectively, of the connector 60 of FIG. 4. As shown best in FIG. 4 and FIGS. 5B and 5C, the body portion 70 includes an aperture 84 that extends from the front surface 80 through the rear surface 72. In the embodiment depicted in FIGS. 4 and 5 this aperture is circular, but those of skill in the art will appreciate that a wide variety of aperture shapes may be employed depending upon the type of fastener used, and that in certain embodiments an aperture is not required. The center axis of the aperture 84 may extend through body portion 70 at an angle that is perpendicular to the rear surface 72. As discussed herein, forming the aperture 84 such that its central axis is substantially perpendicular to the rear surface 72 may facilitate providing a connector that rotates about a moment arm to apply a force that serves to more firmly connect two objects together. However, it will be appreciated in light of the present disclosure that the aperture 84 need not be formed at a 90 degree angle with the rear surface 72 (and in fact the angle could be less than or greater than 90 degrees), and that in certain embodiments, an angle of less than 90 degrees may be preferred.

As discussed in more detail herein, the extending member 90 of connector 60 may protrude from the side surface 82 of body portion 70 at a 90 degree angle. Alternatively, it may protrude such that the extending member 90 intersects the side surface 82 at less than a 90 degree angle. By having the extending member 90 attach to the body portion 70 at less than a right angle may, in some embodiments, facilitate creating a force on one of the two objects that are to be joined towards the second of the two objects, thereby providing for a firmer connection. However, it will be appreciated that in light of the present disclosure that such an upward force may be generated without inclining the extending member 90 relative to the rear surface 80.

Figure 5A:
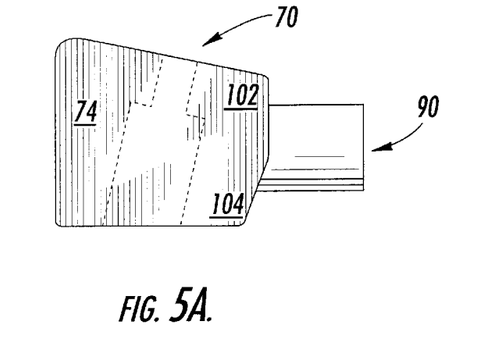
FIG. 5A is a top view of the connector of FIG. 4.
Figure 5B:
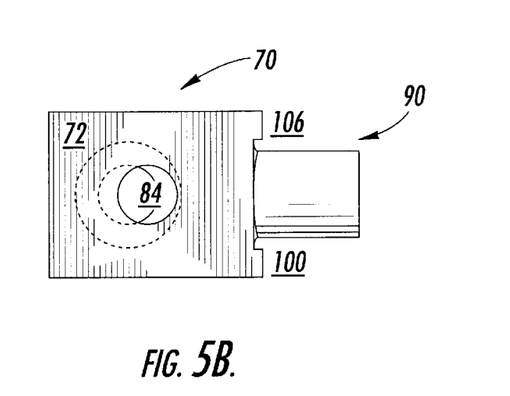
FIG. 5B is a rear view of the connector of FIG. 4.
Figure 5C:
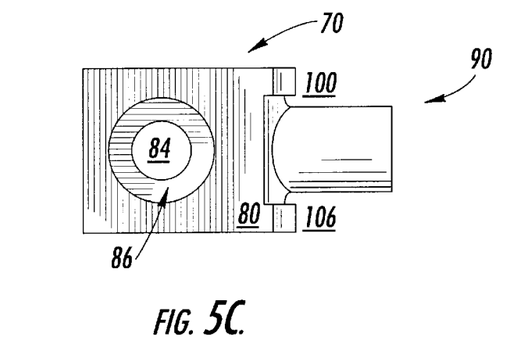
FIG. 5C is a front view of the connector of FIG. 4.

As is shown in FIG. 5C, along the central axis of aperture 84 a larger aperture 86 is formed in the front surface 80 of body portion 70. This second aperture 86 extends only partially through body portion 70. In the embodiment of FIG. 4 and FIG. 5, the diameter of aperture 86 is sufficiently large so as to receive the head of a screw, nail or other fastener. The diameter of aperture 84, on the other hand, is smaller than the head of the fastener, but large enough to receive the distal end of the fastener. In this manner, a fastener may be inserted into the front surface 80 of body portion 70 and through the rear surface 72 into an object, to connect the RTA connector 60 to the object. Typically, the longitudinal axis of apertures 84 and 86 are coextensive.

Figure 5D:
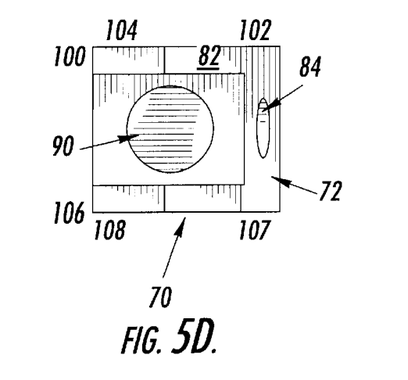
FIG. 5D is a side view of the connector of FIG. 4.

FIG. 5D is a side view of connector 60. As illustrated in FIG. 5D, the extending member 90 protrudes from the side surface 82 of the body portion 70. FIG. 5D also depicts the ribs 100, 106 which protrude laterally from opposed edges of the side surface 82.

Figure 6:
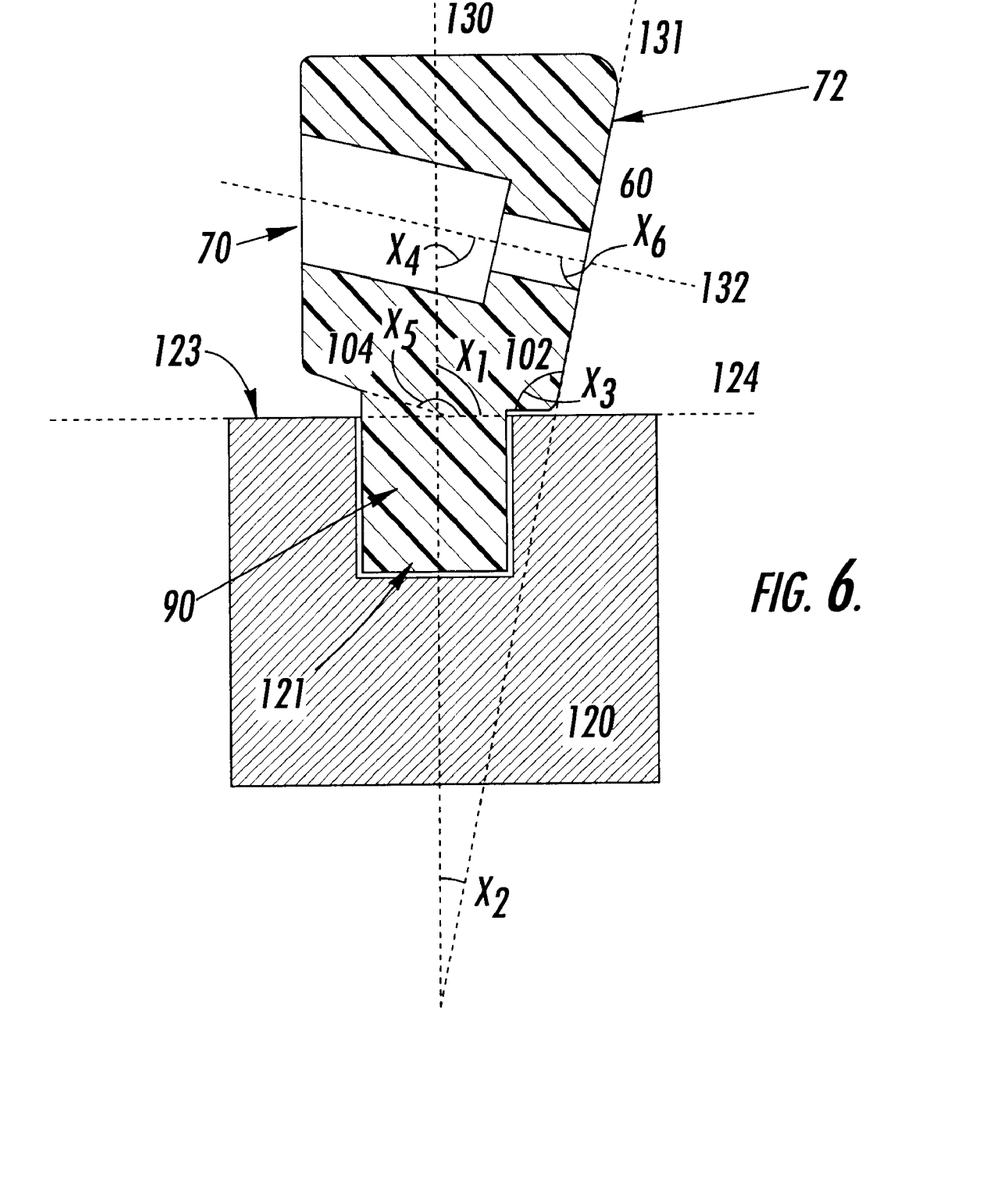
FIG. 6 is a top view of the connector of FIG. 4 inserted into a wall showing various angular relationships between structures of the connector.

FIG. 6 depicts various angular relationships that exist in the connector of FIG. 4. In FIG. 6, the extending member 90 of connector 60 has been inserted into an aperture 121 included in an object 120 that is to be joined to a second object. The portion 102 of rib member 100 of the object 120 defines a plane 124. As shown in FIG. 6, the longitudinal axis 130 of extending member 90 intersects the plane 124 at an angle designated $x_1$. In embodiments of the invention, the angle $x_1$ is greater than 90 degrees. However, it will be understood that angle $x_1$ can be 90 degrees or even less, and various benefits of the present invention may be achieved, depending upon the particular angles selected for the various other angular relationships described herein. In the embodiment of connector 60 depicted in FIG. 6, connector 60 rests on the portion 102 of rib member 100 when the extending member 90 is first inserted into the aperture 121 in object 120.

In embodiments of the connectors according to the present invention, the surface that engages the first object and the extending member that engages the second object are inclined relative to each other. In particular, the longitudinal axis 130 of extending member 90 and the axis 131 defined by the vertical line that runs down the center of rear surface 72 of body portion 70 are inclined relative to each other so that they intersect to form an angle $x_2$, which is also depicted in FIG. 6. In embodiments of the present invention, the angle $x_2$ is greater than 4 degrees. In certain embodiments, the angle $X_2$ is between 10 and 40 degrees. It will be understood, however, that the optimum angle depends upon a variety of factors, including the length and position of the extending member, the flexibility of the material used to form the connector, the size of the aperture relative to the size of the extending member, the length of the front surface of the body portion, and the like.

Figure 7A:
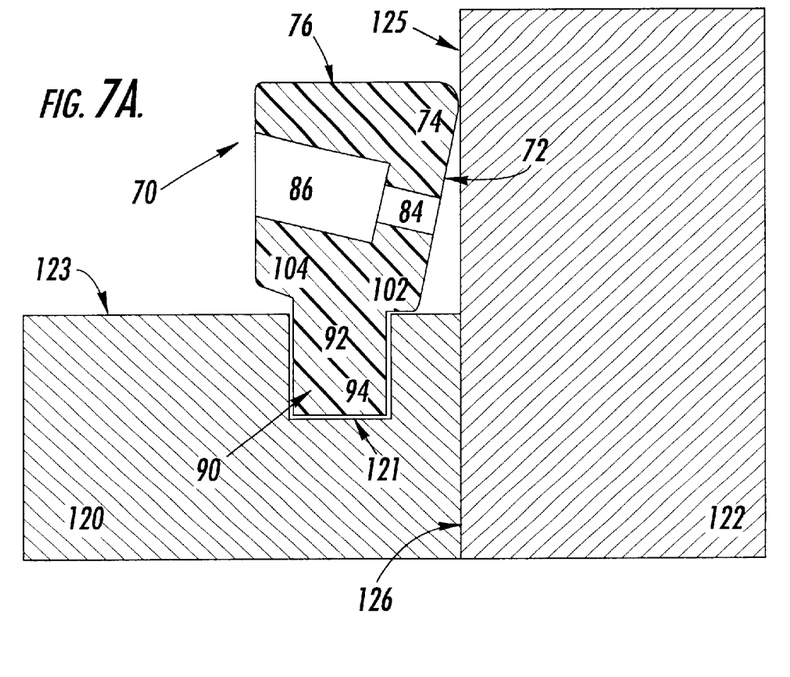
FIG. 7A is a top cross-sectional view of the connector of FIG. 4 taken through the central axis of aperture 84 illustrating initial placement of the connector into a side wall when it is to be used to join side and rear walls together.
Figure 7B:
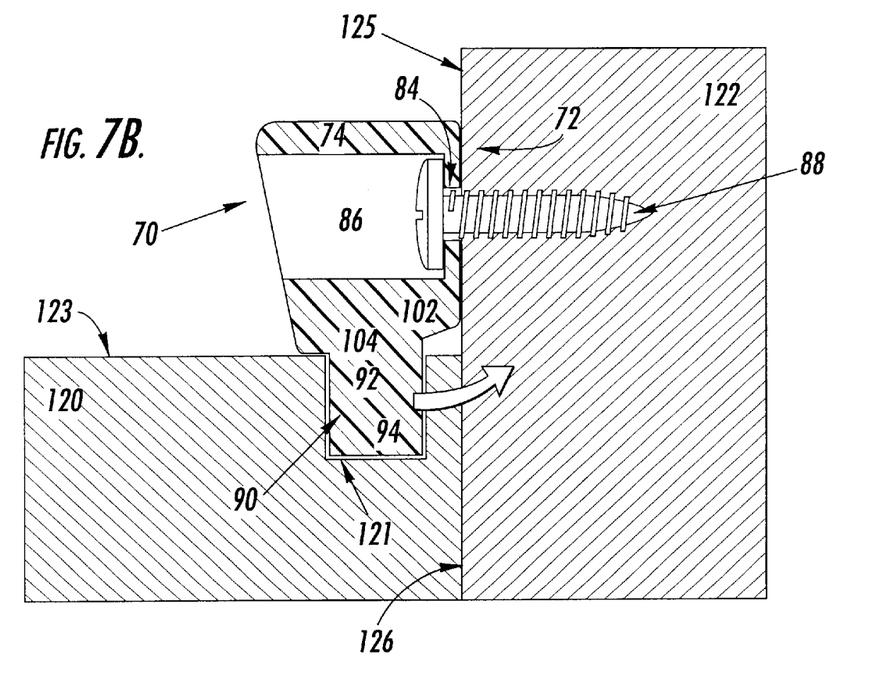
FIG. 7B is a top cross-sectional view of the connector of FIG. 4 taken through the central axis of aperture 84 illustrating the orientation of the connector after insertion of a screw into the rear wall.

By inclining the rear surface 72 of connector 60 relative to the longitudinal axis 130 of extending member 90, when extending member 90 is inserted into an aperture on a first object to be joined and a fastener is used to press the rear surface 72 of body portion 70 against the object to which the first object is to be joined, the extending member 90 acts as a lever that presses the side of the aperture in the first object toward the other object, thereby providing for a tighter connection (see FIGS. 7A–7B herein). In contrast, in the prior art RTA connector 10 depicted in FIGS. 1–3, the plane defined by rear surface 22 of the upper portion 20 and the plane having the same orientation that runs down the longitudinal axis of the downwardly projecting member 40 are parallel to each other, and hence do not intersect.

FIG. 6 also depicts the angle $x_3$ at which the rear surface 72 and the rear edge 102 of the top surface 74 meet. In certain embodiments of the present invention the connector is designed such that the angle $x_3$ is an obtuse angle. However, it will be appreciated in light of the present disclosure that the angle x3 need not be an obtuse angle, and that various of the advantages of the present invention may still be realized with connectors having an angle $x_3$ that is equal to, or even less than, 90 degrees.

FIG. 6 further depicts the angle $x_4$ formed by the intersection of the longitudinal axis 130 of the extending member 90 and the central axis 132 of the aperture 84. In preferred embodiments of the present invention, the angle $x_4$ is less than 90 degrees. In even more preferred embodiments, the angle $x_4$ is in the range between 70 and 85 degrees. By forming the connector 60 to have the angle $x_4$ to be less than 90 degrees facilitates having the extending member 90 act as a lever on a first object when the body portion 70 is joined to a another object that is to be connected to the first object.

FIG. 6 also illustrates the angle $x_5$ formed by the intersection of the segments 102 and 104 that define one edge of the top surface 74. In embodiments of the present invention, the angle $x_5$ is an obtuse angle. In certain embodiments, the angle $x_5$ is in the range between 120 and 170 degrees.

Finally, FIG. 6 depicts the angle $x_6$ formed by the intersection of the axis 131 that runs vertically down the center of rear surface 72 and the central axis 132 of aperture 84. In embodiments of the present invention, the angle $x_6$ is less than or equal to 90 degrees. In certain embodiments, the angle $x_6$ is in the range between 70 and 90 degrees.

FIGS. 7A–7B illustrate the use of connector 60 in joining two objects 120, 122 at a right angle connection. In FIGS. 7A–7B the objects 120, 122 depicted comprise two walls, such as the side and rear pieces of a bookcase, cabinet or other piece of furniture. However, those of skill in the art will appreciate that the connectors of the present invention may be used to connect objects of a wide variety of shapes and sizes, and that variants of the connectors disclosed herein may be used to connect objects at angles other than right angles.

As shown in FIG. 7A, object 122 is placed so that its front surface 125 abuts against the side edge 126 of object 120. An aperture 121 may be pre-drilled into the inner surface 123 of object 120 adjacent the side edge 126 of the object 120 such that when the extending member 90 of connector 60 is inserted into the aperture 121, the edge of rear surface 72 adjacent the side 76 of connector 60 is adjacent the front surface 125 of object 122. As shown in FIG. 7A (for one side only), once the extending member 90 is inserted into aperture 121, the ribs 100, 106 contact the inner surface 123 of object 120 along their respective lateral edges 102, 107. The outer edge of rear surface 72 contacts object 122, but the remainder of connector 60 is not in contact with object 122 at this point. As shown in FIG. 7A, the longitudinal axes of apertures 84, 86 do not at this point form a 90 degree angle with the front surface 125 of object 122.

As shown in FIG. 7B, when a fastener such as screw 88 is used to join the body portion 70 to object 122, the connector changes its orientation as it rotates about a pivot point. Specifically, as the screw 88 is tightened, the rear surface 72 of body portion 70 is rotated so that the plane defined by this surface becomes parallel and in contact with the front surface 125 of object 122. As this rotation occurs, the lateral edges 102, 107 of ribs 100, 106 may lift up off of the inner surface 123 of object 120, and the trailing edges 104, 108 may come in contact with inner surface 123. As the body portion 70 rotates in the counterclockwise direction (as shown in FIG. 7B), the extending member 90 likewise is rotated counterclockwise, as indicated by the arrow in FIG. 7B. This rotation results in the exertion of a force in the direction of the arrow that is applied to the rear sidewall of the aperture 121 in the object 120. As a result of this force, the object 120 is moved into a closer relationship with the object 122, thus providing for a superior connection.

As illustrated in FIG. 7B, if the central axes of the apertures 84, 86 are both perpendicular to the rear surface 72 of body portion 70, when fully tightened, the screw 88 may be inserted at a 90 degree angle into the front surface 125 of object 122. However, it will be appreciated that the longitudinal axis of apertures 84 and 86 need not be so angled for the extending member 90 to impart the force shown by the arrow in FIG. 7B, and hence it will be understood that the apertures may be situated at other angles with respect to the rear surface 72.

Typically, prior art RTA connectors such as connector 10 may have an extending member that has a grooved or ridged outer surface (see FIGS. 1–3). This allows the connector to be screwed or otherwise inserted into the aperture on the object that is to be joined such that the connector is held into the aperture. In certain embodiments of the present invention, the extending member 90 need not necessarily have such a grooved or ridged surface, as the force depicted by the arrow in FIG. 7B may be sufficient to maintain the extending member 90 in the aperture on the object to be joined. This may simplify the manufacture of the connectors according to the present invention. However, it will also be appreciated that the extending member may include such a grooved or ridged outer surface.

It will also be appreciated that the term "surface" as used herein with respect to a face of the connector 60 is intended to encompass both a smooth surface as well as a surface defined by one or more ridges or other protrusions that may be placed in contact with an object. Thus, for example, the connector of FIG. 4 includes a lateral surface that is comprised of the extending ribs 100, 106, as it is these ribs 100, 106 which actually engage the object 120 which is to be joined, and hence it is the ribs 100, 106 which effectively serve as the lateral surface.

Moreover, while the body portion of connector 60 includes six distinct surfaces, it will be appreciated that the connectors of the present invention may be designed to have more or less surfaces. For example, the side surface 76 and the front surface 80 could be designed as a single surface that spans the area between one side edge of rear surface 72 and the front edge of side surface 82. Likewise, one or more of the illustrated surfaces could be subdivided into multiple separate surfaces. It will also be appreciated that the body portion need not be formed exclusively of flat surfaces, but that instead curved surfaces or surfaces having other geometries may be used. By way of example, the side surface 76 and the front surface 80 could be replaced by a single curved surface. Accordingly, it will be appreciated that the scope of the present invention is not intended to be limited to the details of the preferred embodiments discussed above, but instead is defined by the appended claims which point out the novel features of the invention that render it patentably distinct over the prior art.

Figure 8A:
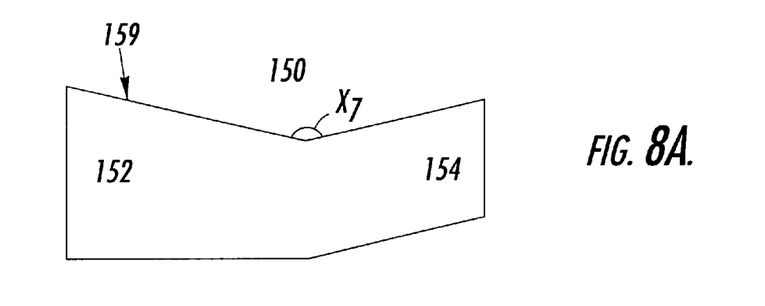
FIGS. 8A–8C show top, rear and front views, respectively, of an alternative embodiment of the connectors of the present invention.
Figure 8B:
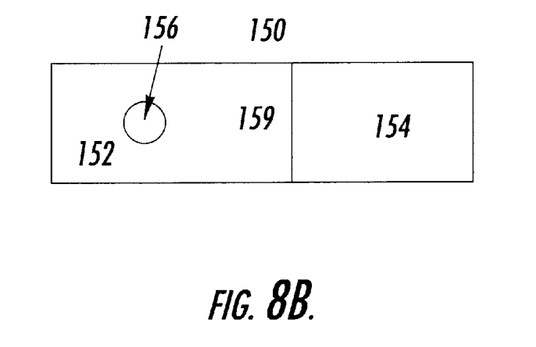
Figure 8C:
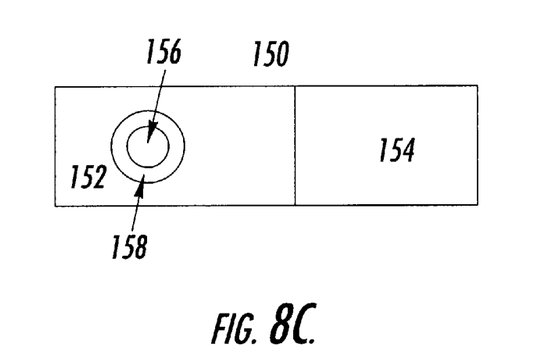

FIGS. 8A–8C depict an alternative embodiment of the connectors of the present invention. In this embodiment, a connector 150 is provided that comprises a protruding portion 152 and a buried portion 154. FIG. 8A is a top view of the connector 150. As shown in FIG. 8A, the protruding portion 152 and the buried portion 154 meet at an obtuse angle $x_7$. FIG. 8B illustrates a rear view of the connector 150. As shown in FIG. 8B, the protruding portion 152 of connector 150 includes an aperture 156 that is similar to the aperture 84 included in the connector 60. FIG. 8C illustrates a front view of connector 150. As shown in FIG. 8C, the front surface of protruding portion 152 of the connector 150 includes a countersunk recess 158 that is similar to the countersunk recess 86 included in connector 60. The connector 150 may be used to connect first and second objects (not pictured in FIG. 8) by inserting the buried portion 154 into a pre-drilled aperture 170 (not pictured in FIG. 8) in one of the objects in a fashion similar to how extending member 90 of connector 60 is inserted into aperture 121 in object 120. Typically, the aperture 170 is located such that the rear edge of the distal end of protruding portion 152 is adjacent to or touching the second of the objects that are to be joined. A fastener such as a screw is then inserted through aperture 158 in the front of protruding portion 152, with the leading edge of the fastener extending through aperture 156 and out the rear surface 159 of protruding portion 152. This fastener may then be embedded in the second object to join the protruding portion 152 of connector 150 to the second object. As the fastener is tightened into the second object, the rear surface 159 (see FIG. 8B) is drawn flush with the second object along its entire length, causing the distal end of the buried portion 154 to rotate towards the second object.

Similar to the discussion above with respect to connector 60, this rotation causes the buried portion 154 of connector 150 to exert a force on the side of aperture 170 that acts to draw the two objects to be joined closer together, thereby providing for a superior connection.

Figure 9:
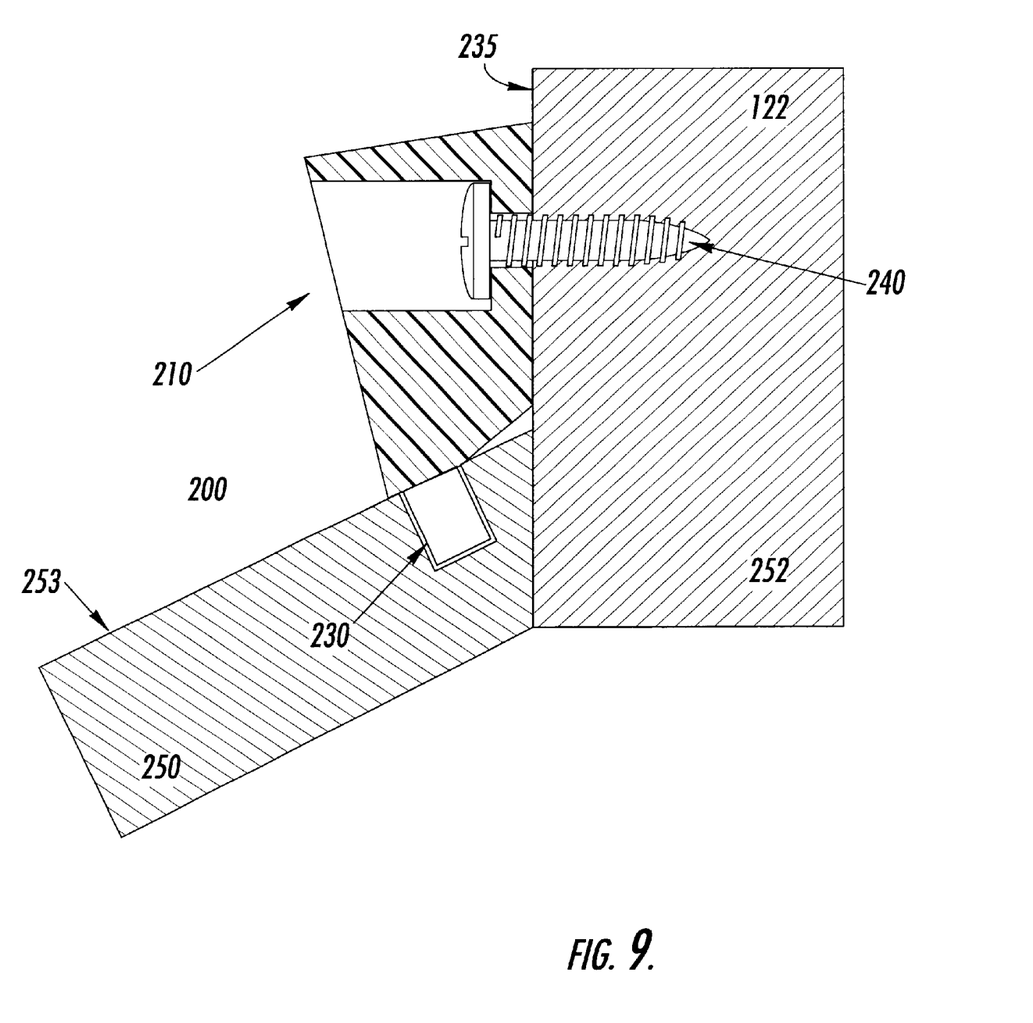
FIG. 9 shows a top view of another alternative embodiment of the connectors of the present invention.

As noted above, embodiments of the present invention may also be used to join two objects at angles other than 90 degrees. FIG. 9 depicts one such embodiment that may be used to join two objects at an obtuse angle. As shown in FIG. 9, a connector 200 is provided that includes a body portion 210 and an extending member 230. The body portion 210 is similar to the body portion 70 of connector 60, except that it is configured to fit between two objects that are to be joined at an obtuse angle (i e., an angle of about 120 degrees in FIG. 9). The body portion 210 includes two apertures that are configured to receive and retain a fastener 240 which are similar to those provided in the body portion of connector 60. As is clear from FIG. 9, the connector 200 operates under the same principal as connector 60 discussed above, except that it is configured to fit between and join two objects that meet at other than a 90 degree angle.

In preferred embodiments of the present invention, connectors such as connectors 60, 150, 200 are manufactured out of thermoplastics including, but not limited to, styrene, ABS and nylon. Those of skill in the art will also appreciate that the connectors may be formed out of a wide variety of different materials, including any number of metals, ceramics, synthetic compounds or the like. Typically, these connectors are injection molded. As methods of manufacturing such connectors via conventional molding techniques are well known to those of skill in the art, the methods for manufacturing these connectors will not be discussed further herein.

Those of skill in the art will also appreciate that the connectors of the present invention are particularly well-suited for products that are not assembled at the factory, but instead are packaged in pieces along with connection devices for later assembly at a retail store or by the consumer. The present connectors are easy-to-use, may be manufactured at low expense, and may provide an outstanding connection. However, the connectors of the present invention also may be used advantageously in the construction of pre-assembled products. In fact, they may advantageously be used to hold two objects in place that are being glued together, and then may either be removed or left in place to provide additional support to the connection. The connectors of the present invention may also be advantageously employed in joining products manufactured from low tolerance parts which may not meet at the precise angle desired.

As noted above, a variety of fasteners or other attachment means may be used with the connectors disclosed herein, including screws, nails, staples, tacks, rivets, dowels, dowel screws, rods, pins and the like. The fasteners or attachment means used may be configured to fit through an aperture in the connection device (as in the exemplary connectors pictured herein). However, it will be realized that other connection devices may be used that do not require an aperture in the body portion of the connection device. For instance, a staple could be used that was configured to fit around the front, top and bottom surfaces of the connector (e.g., surfaces 80, 74, 78 of body portion 70 of connector 60) to join the connector to an object.

As discussed above, in various embodiments of the present invention an extending member on the connector is inserted into an aperture on one of the objects that is to be joined. It will be understood that this aperture can be round or of various other shapes, and that it can be drilled perpendicular to the face of the object or at an angle of less than or greater than 90 degrees.

While the extending member in the connectors of the present invention has been illustrated as part of the connector, it will also be understood that a separate device may be used as the extending member. For instance, an aperture could be included in the lateral portion of the body portion of the connector that was configured to receive the longitudinal, but not the head portion, of a screw or nail. The longitudinal portion of such a screw or nail could then be inserted through this aperture into the object to serve as the extending member.

Figure 10:
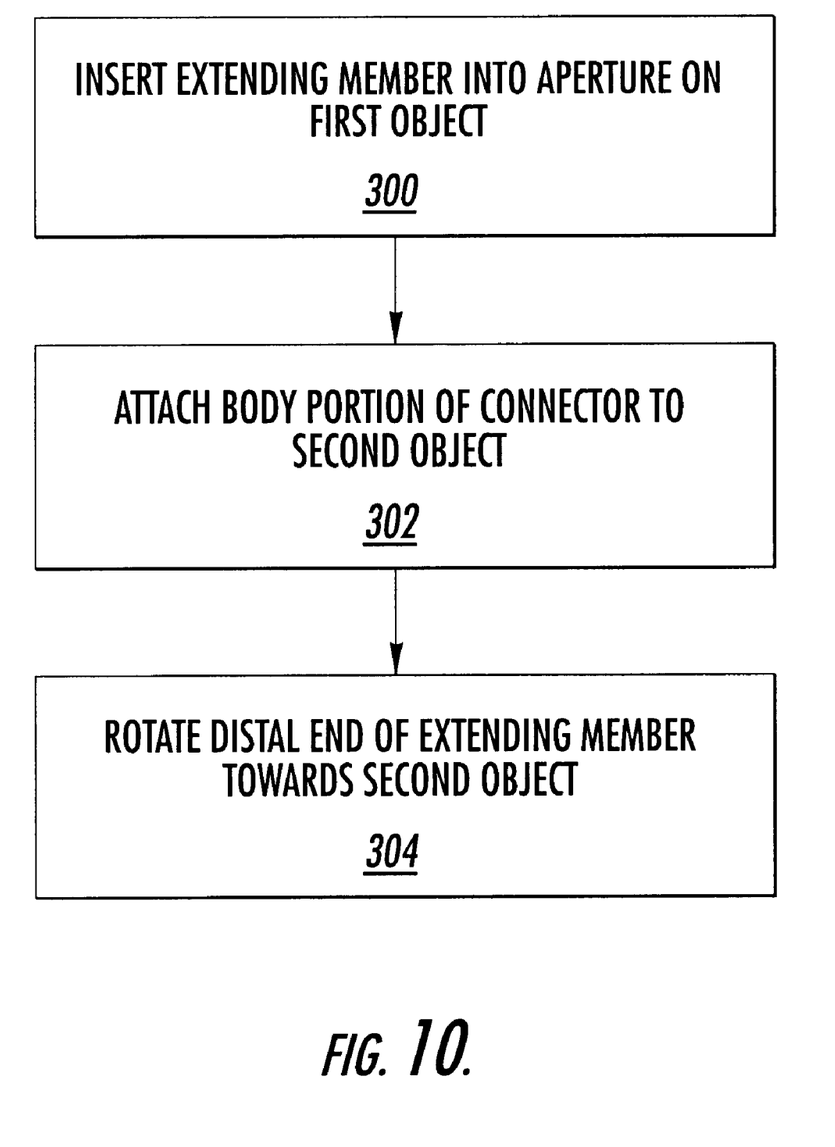
FIG. 10 is a flow chart illustrating methods of connecting two objects together according to the present invention.

FIG. 10 is a flowchart diagram that describes aspects of methods of the present invention. As shown in FIG. 10, pursuant to these methods a connector may be used to join a first object to a second object by first inserting an extending member on the connector into an aperture on one of the objects (block 300). The body portion of the connector may then (or prior to insertion of the extending member) be attached to the other object (block 302). In attaching this fastener, the distal end of the extending member rotates toward the object to which the body portion of the connector is joined (block 304). This results in a superior join.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A connector for joining a first object and a second object, comprising:
    a body portion having a first surface for engaging said first object, and a second surface that is configured to be located adjacent the second object, wherein said first surface and said second surface meet at an angle ($x_3$) that is greater than 90 degrees;
    an extending member protruding from said body portion and configured to fit within an aperture on said second object; and
    a fastener connecting said body portion and said first object;
    wherein said first surface and said extending member are inclined relative to each other.

2. The connector of claim 1, wherein said body portion further comprises a third surface that is configured to be located adjacent said second object, and wherein said second surface and said third surface meet at an angle ($x_5$) that is greater than 100 degrees.

3. The connector of claim 2, wherein said third surface contacts said second object when said fastener is used to connect said body portion and said first object.

4. The connector of claim 2, wherein said second surface and said third surface meet at an angle ($x_5$) that is between 120 and 170 degrees.

5. The connector of claim 1, wherein the angle ($x_2$) formed by the intersection of the axis defined by a vertical line that bisects said first surface and the longitudinal axis of the extending member is at least 4 degrees.

6. The connector of claim 5, wherein the angle ($x_2$) formed by the intersection of the axis defined by a vertical line that bisects the first surface and the longitudinal axis of the extending member is between 10 and 40 degrees.

7. The connector of claim 1, wherein the fastener comprises a screw.

8. The connector of claim 1, wherein said body portion includes an aperture, and wherein said fastener is connected to said first object through said aperture.

9. The connector of claim 1, wherein the extending member has a smooth exterior surface.

10. The connector of claim 8, wherein the central axis of said aperture is perpendicular to said first surface.

11. The connector of claim 10, wherein the central axis of said aperture intersects the plane defined by said first surface at an angle ($x_6$) that is between 70 and 90 degrees.

12. The connector of claim 8, wherein the longitudinal axis of said extending member and the central axis of said aperture intersect at an angle ($x_4$) that is less than 90 degrees.

13. The connector of claim 12, wherein the longitudinal axis of said extending member and the central axis of said aperture intersect at an angle ($x_4$) that is between 70 and 85 degrees.

14. The connector of claim 1, wherein the longitudinal axis of said extending member is inclined relative to the surface of the first object to which the body portion is joined.

15. A connector for joining a first object and a second object, comprising:
    a body portion having a front surface for engaging said first object;
    an extending member protruding from the bottom of said body portion and configured to fit within an aperture on said second object; and
    attachment means for affixing said body portion to said first object;
    wherein the extending member rotates about a moment arm to urge a side of the aperture in said second object towards the first object when said attachment means is used to affix said body portion to said first object.

16. The connector of claim 15, wherein the angle ($x_2$) formed by the intersection of the axis defined by a vertical line that bisects said front surface and the longitudinal axis of the extending member is at least 4 degrees.

17. The connector of claim 15, wherein said bottom of said body portion and said front surface meet at an obtuse angle.

18. The connector of claim 15, wherein the central axis of said aperture is perpendicular to said first surface.

19. The connector of claim 15, wherein the longitudinal axis of said extending member and the central axis of said aperture intersect at an angle of less than 90 degrees.

20. A connector for joining a first object and a second object, comprising:
    a body portion having a front surface for engaging said first object;
    an extending member protruding from the bottom of said body portion and configured to fit within an aperture on said second object; and
    a fastener connecting said body portion and said first object;
    wherein the longitudinal axis of said extending member and the central axis of said aperture intersect at an angle of less than 90 degrees.

21. A connector for joining a first object and a second object, comprising:
    a body portion having a front surface for engaging said first object;
    an extending member protruding from the bottom of said body portion and configured to fit within an aperture on said second object; and
    a fastener connecting said body portion and said first object;

wherein the longitudinal axis of said extending member is inclined relative to the surface of the first object to which the body portion is joined such that the distal end of said extending member is closer to said first object than the base of said extending member.

22. A method of connecting a first object to a second object using a connector comprising a body portion having a first surface and an extending member that extends from said body portion, the method comprising:

inserting the extending member of the connector into an aperture in the second object; and attaching the body portion of the connector to said first object such that the first surface of the body portion contacts said first object;

wherein the act of attaching the body portion of the connector to the first object causes the distal end of the extending member to rotate towards said first object.

23. The method of claim 22, wherein the body portion of the connector is attached to said first object using a screw, and wherein the act of tightening the screw causes the extending member to push the second object towards said first object.

24. The method of claim 22, wherein the body portion of the connector is attached to said first object using a screw, and wherein the act of tightening the screw causes the extending member to push the second object towards said body portion of said connector.

25. The method of claim 22, wherein the connector is configured such that after the extending member is inserted in the aperture in the second object, but prior to attaching the body portion of the connector to said first object, the top edge of said first surface extends at least 0.1 millimeters farther towards the ultimate location of said first object than does the bottom edge of said first surface.

26. An enclosure, comprising:

first and second walls that are substantially perpendicular to each other;

a connector, comprising:

a body portion having a first surface that engages said first wall;

an extending member protruding from said body portion and configured to fit within an aperture on said second wall; and a fastener connecting said body portion and said first wall;

wherein said first surface and said extending member are inclined relative to each other.

27. The enclosure of claim 26, wherein said enclosure is a cabinet.

28. The enclosure of claim 26, wherein said body portion further comprises a second surface that is configured to be located adjacent said second wall, and wherein said first surface and said second surface meet at an angle ($x_3$) that is greater than 90 degrees.

29. The enclosure of claim 28, wherein said body portion further comprises a third surface that is configured to be located adjacent said second wall, and wherein second surface and said third surface meet at an angle ($x_5$) that is greater than 100 degrees.

30. The enclosure of claim 29, wherein said third surface contacts said second wall when said fastener is used to connect said body portion and said first wall.

31. The enclosure of claim 30, wherein said second surface and said third surface meet at an angle ($x_5$) that is between 120 and 170 degrees.

32. The enclosure of claim 26, wherein the angle ($x_2$) formed by the intersection of the axis defined by a vertical line that bisects said first surface and the longitudinal axis of the extending member is at least 4 degrees.

33. The enclosure of claim 32, wherein the angle ($x_2$) formed by the intersection of the axis defined by a vertical line that bisects said first surface and the longitudinal axis of the extending member is between 10 and 40 degrees.

34. The enclosure of claim 26, wherein the fastener comprises a screw.

35. The enclosure of claim 26, wherein said body portion includes an aperture, and wherein said fastener is connected to said first wall through said aperture.

36. The enclosure of claim 26, wherein the extending member has a smooth exterior surface.

37. The enclosure of claim 35, wherein the central axis of said aperture is perpendicular to said first surface.

38. The enclosure of claim 37, wherein the central axis of said aperture intersects the plane defined by said first surface at an angle ($x_6$) that is between 70 and 90 degrees.

39. The enclosure of claim 35, wherein the longitudinal axis of said extending member and the central axis of said aperture intersect at an angle ($x_4$) that is less than 90 degrees.

40. The enclosure of claim 39, wherein the longitudinal axis of said extending member and the central axis of said aperture intersect at an angle ($x_4$) that is between 70 and 85 degrees.

41. The enclosure of claim 26, wherein the longitudinal axis of said extending member is inclined relative to the surface of the first wall to which the body portion is joined.

\* \* \* \* \*